United States Patent
Cerda

(10) Patent No.: US 9,325,836 B2
(45) Date of Patent: Apr. 26, 2016

(54) LEARNING GUARD SYSTEM

(71) Applicant: Anthony Cerda, Bedminster, NJ (US)

(72) Inventor: Anthony Cerda, Bedminster, NJ (US)

(*) Notice: Subject to any disclaimer, the term of this patent is extended or adjusted under 35 U.S.C. 154(b) by 78 days.

(21) Appl. No.: 14/120,179

(22) Filed: May 2, 2014

(65) Prior Publication Data

US 2015/0319293 A1 Nov. 5, 2015

(51) Int. Cl.
*H04M 3/00* (2006.01)
*H04M 1/725* (2006.01)
*H04W 60/04* (2009.01)
*H04W 48/04* (2009.01)

(52) U.S. Cl.
CPC .......... *H04M 1/72577* (2013.01); *H04W 48/04* (2013.01); *H04W 60/04* (2013.01)

(58) Field of Classification Search
USPC ........ 455/404.2, 405, 414.2, 418, 419, 456.1, 455/456.2, 456.3, 466, 41.1, 41.2, 569.2, 455/575.9
See application file for complete search history.

(56) References Cited

U.S. PATENT DOCUMENTS

| | | | | |
|---|---|---|---|---|
| 7,899,438 | B2 | 3/2011 | Baker et al. | 455/405 |
| 8,285,249 | B2 | 10/2012 | Baker et al. | 455/405 |
| 8,315,617 | B2 | 11/2012 | Tadayon et al. | 455/418 |
| 8,374,623 | B2 | 2/2013 | Vellanki et al. | 455/456.1 |
| 8,412,154 | B1 * | 4/2013 | Leemet | H04M 15/58 455/406 |
| 8,428,973 | B1 | 4/2013 | Hopkins, III | 705/4 |
| 8,561,151 | B2 | 10/2013 | Dorsey et al. | 726/4 |
| 8,588,735 | B1 | 11/2013 | Baker et al. | 455/406 |
| 8,611,885 | B1 | 12/2013 | Baker et al. | 455/418 |
| 8,626,119 | B2 | 1/2014 | Leemet et al. | 455/406 |
| 8,630,612 | B1 | 1/2014 | Baker et al. | 455/405 |
| 8,805,281 | B2 * | 8/2014 | Hsu | H04M 1/7253 370/338 |
| 8,989,705 | B1 * | 3/2015 | Katzer | H04L 65/1016 370/328 |
| 8,989,779 | B1 * | 3/2015 | Centore, III | H04W 4/22 455/456.1 |
| 2003/0125014 | A1 * | 7/2003 | Inukai | H04W 8/245 455/410 |
| 2010/0285786 | A1 * | 11/2010 | Yamada | G06F 3/0482 455/418 |
| 2013/0040629 | A1 * | 2/2013 | Sprigg | H04W 4/001 455/419 |
| 2013/0295872 | A1 * | 11/2013 | Guday | H04W 4/22 455/404.1 |

OTHER PUBLICATIONS

Phone Jammer @ http://www.phonedog.com/2009/03/10/washington-school-purchases-cell-phone-jammer-to-thwart-texting-teens/.

* cited by examiner

*Primary Examiner* — Dai A Phuong

(74) *Attorney, Agent, or Firm* — Ernest D. Buff & Associates, LLC; Ernst D. Buff; Dave Narasimhan

(57) ABSTRACT

A Learning Guard System protects the attention of students in a classroom by requiring the student to download an 'app' from the Learning Guard website. During installation the 'app' requires the student to provide their name and a list of emergency contacts which are stored in the memory of the smart phone and by the Learning Guard cloud database. When a student enters a classroom doorway cube transmitter mounted thereon interacts with the 'app in the smart phone to thereby acquire the smart phone ID and turn off the smart phone functionality, including voice, text communication, Internet access, playing music and videos. This prevent communication of the student with others, excepting emergency contacts both public and private. The cube transmitter communicates the smart phone ID to a base station linked to the Learning Guard cloud database, which creates a database of students in the classroom. When the student exits the classroom through the doorway, all of the previously extant smart phone functionalities are turned on.

11 Claims, 3 Drawing Sheets

LEARNING GUARD SYSTEM

FIELD OF THE INVENTION

The present invention relates to a method and device that blocks smart phone usage and distraction in a school class room environment enabling the students to pay attention to what is taught in a classroom.

DESCRIPTION OF THE PRIOR ART

Numerous prior art patents and disclosures relate to blocking all or some aspects of the use of a smart phone or cell phone in various environments. These patent disclosures do not specifically address the problems associated with students attending a class in an educational institution.

U.S. Pat. Nos. 7,899,438, 8,285,249, 8,588,735, 8,588,735, 8,611,885 and 8,630,612 to Baker, et al. disclose feature management of a communication device. This real-time device management system establishes and enforces policies or rules associated with certain features or functions performed by the device. Modern communication devices are capable of many operations, including making and receiving calls, exchanging data, playing games and music, sending and receiving email, accessing web sites, and paying for goods and services. Depending on usage of a communication device, for example by children, employees, etc., there oftentimes arises a need or desire to regulate that usage and to determine a payment mechanism for goods or services. In addition to providing all of the features associated with a device, service providers must be able to establish and enforce rules (policies) regulating how and when that device can be used and who will pay for a good or service requested by the user of the device. Such usage control mechanisms do not stop the functionality of a smart phone when a student is in a classroom of an educational institution.

U.S. Pat. No. 8,315,617 to Tadayon, et al. discloses a method for controlling mobile device functions and features. Certain mobile device functions and features, which could cause distraction to the user, are disabled when the user is engaged in another activity. In one example, other mobile device features are enabled in response to occurrence of events related to the user or environment. Another example addresses controlling mobile device features, such as SMS, while the user is in a vehicle or driving. A further example restricts the ability of the driver of a vehicle to text while the vehicle is in motion by automatically disabling the texting ability of mobile device within and around the perimeter of the driver's seat. Other variations, examples, improvements, detection mechanisms, models, techniques, calculations, verification mechanisms, and features are also described. This device uses several transmitters/receivers that reside within an automobile and sends appropriate code to each of the cell phones located within or outside specific small range regions within the automobile, disabling certain functionality. When no code is received from a transmitter/receiver, all cell phone functions are restored. The classroom in an educational institution has many students present therewithin and individual transmitters/receivers cannot be located within a short range from each of the students in the classroom. For this reason, the device disclosed by the Tadayon patent would not operate to disable functionality of a smart phone.

U.S. Pat. No. 8,374,623 to Vellanki, et al. discloses location based, software control of mobile devices. Methods are disclosed for controlling mobile computing devices such as laptops, PDAs and cellular telephones, based on their location. A mobile computing device may include a software-rendered map of defined geographic regions, location handlers for defining behavior of a mobile device in a given geographic region, and a location handling engine for determining when a new geographic zone has been entered and exited, and for executing and terminating location handlers accordingly. The device uses GPS to acquire location and correlate with internal map. The system does not enable disabling of operations of a smart phone except emergency call functions when a student enters a classroom.

U.S. Pat. Nos. 8,412,154 and 8,626,119 to Leemet, et al. disclose a system and method for managing a mobile device. This system and method provides a notification when specified thresholds are reached and/or execute defined rules for the mobile device. The rules can relate to any function of the mobile device, including but not limited to, notification when a percentage of voice/data/SMS is reached during a billing cycle, notification when a mobile device leaves a geo-fence, and restrict a mobile device when a threshold is reached. The system provides a versatile management system allowing a user to effectively control use of a mobile device and manage costs. The management involves communication between a server and a mobile unit to determine what facilities may be available in a cell phone so as to minimize costs. This system does not terminate the functionality of a smart phone while excepting emergency data when a student enters a classroom.

U.S. Pat. No. 8,428,973 to Hopkins, III discloses a systems and methods for automatically disabling mobile device usage while driving. This system is implemented on one or more processors, and may comprise at least one subsystem configured for determining whether a mobile device is traveling at a speed greater than a predetermined threshold and at least one subsystem configured for disabling a functionality of the mobile device if it is determined that the mobile device is traveling at a speed greater than the predetermined threshold. The subsystem is configured for determining whether a mobile device is traveling at a speed greater than a predetermined threshold may comprise at least one subsystem configured for receiving output data from an accelerometer on the mobile device and at least one subsystem configured for using said data to determine a current speed of the mobile device. This system monitors the speed and acceleration of a vehicle when driving and shuts off voice communication when the vehicle speed and acceleration exceed preset values. This device does not turn the functionality of a smart phone while preserving emergency call capability when the student enters a classroom.

U.S. Pat. No. 8,561,151 to Dorsey, et al. discloses a mobile software entitlements manager. A mobile entitlements manager, implemented on a mobile device, stores the software entitlements belonging to a user of the mobile device. The mobile device communicates with client computers on which the user wishes to run software applications. Messages are exchanged between the client and the mobile device to enable activation, continued running, and to deactivate client applications in accordance with the entitlements available to the user. The mobile entitlements manager updates its entitlement information by communicating with a remote entitlements server, and informs the entitlement server of the status of programs running on clients in communication with the device. The entitlements manager handles entitlements for multiple applications and for multiple licensed entities, such as individual users, sites, client computers, or organizations. The entitlement manager has to check with a remote server to see if the mobile device can execute a given application. This device does not shut off the functionality of a smart phone except for emergency services when a student with a smart phone enters the doorway to a classroom.

Internet Publication Phone Jammer at http://www.phonedog.com/2009/03/10/washington-school-purchases-cell-phone-jammer-to-thwart-texting-teens/ discloses a mobile phone jamming device installed in a classroom. This system only jams the communication frequencies that a cell phone uses for making and receiving mobile calls and does not disable texting and Internet functions.

Based on the foregoing, there exists a need in the art for a method and device with combinations of features that reliably disable smart phone functions commonly used by a student in a classroom, including voice communication, text messaging, web access, viewing videos or listening to music while still allowing receipt emergency transmissions and enabling an emergency call.

SUMMARY OF THE INVENTION

The present invention provides a method and device that blocks cell phone usage and distraction in a school classroom environment, enabling the students to pay attention to what is taught in the classroom. Significantly, smart phones carried by the students are required by the teaching establishment to download an 'app' from the Internet using an 'app' configured for the Learning Guard System and available from a system provider's market place such as the Google Play Store, the Apple App Store or Blackberry's Blackberry World. The 'app's are available for Iphone platform, Blackberry platform or Android platform. The student must sign into the 'app', providing student name and creating a list of emergency contacts. This emergency contact list will be stored within the memory of the smart phone and will be retrieved when the smart phone is disabled and a call from the emergency contact is received by the smart phone; and will not be blocked. The emergency communication features available include public emergency numbers and personal emergency numbers such as home, significant other and the like, as well as a modifiable list created by the student. This emergency contact list is stored in the smart phone memory, base station as well as Internet connected Learning Guard cloud database, The 'app' disables specific functionalities of the smart phone s upon entry into the classroom. The entry door to the classroom has a cube short-range transmitter that communicates with the 'app' present in the smart phone and disables all functions of the smart phone except emergency communication features as the student enters the classroom. The cube transmitter communicates with a stationary base station that has Internet connectivity. The cube transmitter acquires the identity of the smart phone and correlates it with the student information recorded when the 'app' was installed. Additionally, the classroom itself may have a cube transmitter with similar local server and Internet connectivity, and may turn off the functionality of a smart phone in case the smart phone is deliberately unpowered, for example, by removing the battery to avoid the smart phone turning off feature. When the student leaves the classroom through the doorway, the smart phone again communicates with the cube transmitter using the 'app', which now turns on all the features, causing the smart phone features to become usable.

The cube transmitter also communicates with a base station that is present adjacent to the classroom, and which has Internet connectivity. The cube receives the smart phone identity and correlates with the name of the student, which was registered in the Internet when the 'app' is downloaded and installed using Internet connection to the Learning Guard website. This communication of the cube transmitter with the base station enables the base station to know the name of the student's smart phone identity as the student enters the classroom, at which point, the 'app' present in the smart phone turns off the voice communication, text messaging, web access, viewing of videos or listening to music while within the classroom. The emergency contact list stored in the smart phone memory is used as an exclusion list for banning incoming cell phone calls. The list of students entering the classroom is maintained as a list of students present in the classroom in the base station and this list is communicated to the teacher's computer in the classroom using a direct connection between the teacher's computer and the base station, or by using the Internet. The teacher may add remarks regarding the behavior of a particular student in the classroom. Since the classroom also has a cube transmitter, the teacher may turn on the smart phone of a particular student, enabling a web search of specific information by a student. The teacher may turn off the student's smart phone functionality after the web access is complete. When the student leaves the classroom doorway, the smart phone 'app' communicates with the cube transmitter. The smart phone functionality is restored and the list of students in the classroom is updated in the base station, indicating that the student has left the classroom.

Briefly stated, the smart phones of the students are required to download an 'app' from the Learning Guard Website using the Internet. The 'app' interacts with a cube transmitter located on the doorway that provides entry into a classroom. During the process of downloading and installing the 'app', the student must sign in with his or her name, create a list of emergency contacts whose phone connectivity should not be turned off. The sign up process acquires the smart phone ID, the student name and emergency contact list and stores data in the smart phone memory as well as a cloud Learning Guard database that is available to all cube transmitters. When a student enters the doorway, the cube transmitter interrogates the smart phone and receives a smart phone ID, and communicates data to a base station that has Internet connectivity. The base station links the smart phone ID with the student's name and emergency contact list to the cloud Learning Guard database, which is available for all cube transmitters and other devices. The database in the base station is updated, indicating that the student has entered the classroom and the smart phone functionality has been accordingly turned off. This database of students that have entered the classroom is available to the teacher's computer, and the teacher may decide to turn on the functionality of any smart phone within the classroom using a cube transmitter present within the classroom.

The transmission from the cube transmitter travels only for a short distance, encompassing the entry doorway. The transmission may be a Bluetooth communication, infrared communication, Internet communication or other means of communication. The 'app' turns off all the features of the smart phone, including voice, text, web access, play music or video and other common features. Thus the smart phone cannot interact with others inside or outside the classroom for recreational purposes or be used to seek answers to quiz questions in an example thereby preventing inappropriate phone use during exams. The absence of smart phone distraction enables the student to pay attention to what is taught in the classroom. The student is barred from re-establishing smart phone connectivity for example by shutting the smart phone off and restarting or removing the battery to erase its memory status by the use of a second cube transmitter located within the classroom. The second cube transmitter bathes the entire class room with the transmitted signal, so that the previous battery removed smart phone functionality will be turned off. The base station knows the proper off-condition status of the smart phone from the database of students in the classroom, and continuously monitors the phones to assure that they remain in the off-condition despite being re-energized within the classroom by insertion of the removed battery. When the student exits the classroom through the doorway, the transmitted signal is recognized by the 'app' and turns on the functionality of the smart phone, if it has been previously turned off.

In its preferred embodiment, the Learning Guard System of the present invention comprises:

1) Each student smart phone having a required downloaded 'app' from the Learning Guard website;

2) Process of downloading the 'app' requires the student to sign in and provide the student's name, associated smart phone ID, together with a list of allowed emergency contact information, which are stored in the smart phone memory and by a Learning Guard database in the cloud, and are available for all cube transmitters;

3) When the student enters a classroom doorway, the smart phone 'app' of the student communicates with a cube transmitter having battery back up mounted on the doorway to a classroom acquiring smart phone ID and the 'app' turning off all functionality of the smart phone including voice, text communication, Internet access and playing of music or video files allowing only emergency contacts present in the emergency contact list in the memory of the smart phone to reach said smart phone;

4) Said cube transmitter communicating the smart phone ID to a base station that is linked to an Internet cloud Learning Guard database application, updating a database of students in the classroom, recording the entry of the student into the doorway of the classroom with the smart phone functionality turned off, and making the database of students in the classroom available to the teacher's computer in the classroom;

5) Said 'app' turning off all the smart phone features including voice, text transmission or receipt, music, video or access to web as the student enters a classroom preventing distraction of the students, enabling the student to concentrate on what is taught, and preventing improper phone use that involves communication with others inside or outside the classroom;

6) Said 'app' allowing only emergency contacts from the list to be present in the memory of the smart phone;

7) Said teacher using a classroom computer and a cube transmitter present within the classroom to restore functionality of the smart phone for a particular student, enabling that student to execute a web search and access other smart phone features;

8) When the student leaves the classroom the 'app' receives a communication from the short rage cube transmitter that turns on the full functionality of the smart phone; and whereby the student is isolated from smart phone distractions when present within a classroom, increasing the ability of the student to concentrate what is being taught in the classroom.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
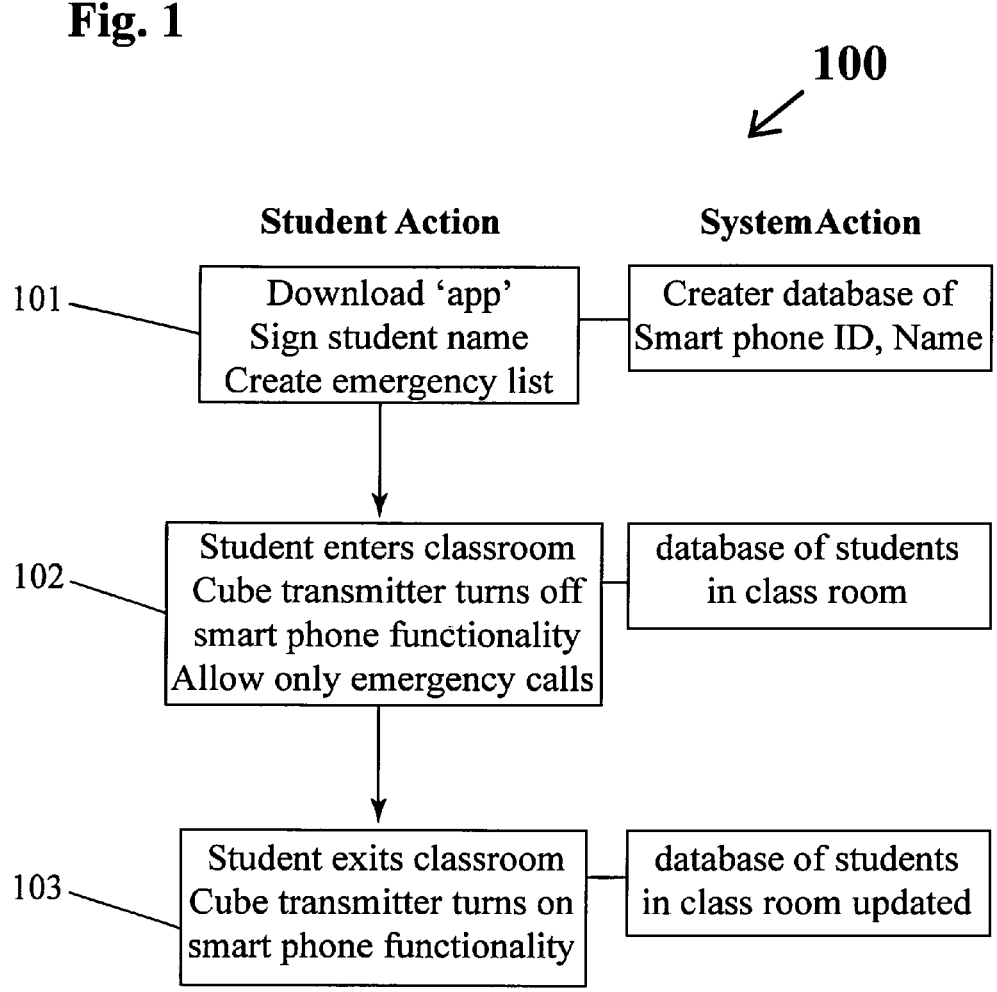
FIG. 1 is a illustration the steps involved in the operation of the Learning Guard System.

This invention relates to a method and device that blocks smart phone usage and distraction in a school class room environment, enabling the students to pay attention to what is taught in the class room. Significantly, the smart phone s carried by students are required to download an 'app' and sign up with the student's name, and create an emergency contact list. This student data is stored in the internal memory of the smart phone, and a copy of it is maintained at the Learning Guard web based database. The smart phone 'app' disables smart phone functionalities, including voice communication, text communication, playing music files or video files and web searches. Phone calls from emergency contacts include public emergency notifications as well of list of contacts created by the student at sign up time. The student may revise the contact list for allowed phone calls by signing into the Learning Guard website. When the student enters the classroom, the smart phone 'app' communicates with the cube transmitter, which has a short operating range incorporated in the door frame, and turns off functionality of the smart phone, including voice communication, text messaging, web search, listening to music or watching videos. All incoming smart phone calls are blocked except public emergency notifications and calls present from contacts present in the emergency contact list Additionally, the classroom itself has a cube transmitter that turns off functionality of a smart phone in case the smart phone is turned off, for example, by removing the battery to avoid the smart phone turning-off feature. The teacher using the classroom computer may turn on any student's smart phone functionality, using the cube transmitter in the classroom that accesses smart phone ID from the base station database of students present in the classroom. When the student leaves the classroom through the doorway, the smart phone features are turned on so that the smart phone features become usable.

The Learning Guard System requires that each student have their smart phone loaded with a down loadable 'app'. When downloaded, the 'app' has the functionality of communication with a short-range cube transmitter having a battery backup and incorporated in the entrance doorway to a class room. The transmission from the short-range cube like transmitter with a battery backup and the 'app' software turns off all the functionality of the smart phone. When the student and smart phone enter the classroom, the smart phone usage including voice communication, text messaging, video or music playback or access to the web is prevented. Thus the student is not distracted by the features of the smart phone and cannot communicate with others inside or outside the classroom through voice or text messaging and is better able to focus on what is taught in the classroom.

The objective of the invention is to create a device and software/application that will eliminate smart phone use in classrooms and improve students' grades by removing technological distractions. The key element of the invention is to create a cube transmitter device that is attached to the top of the classroom doorframe. This device will scan a student's smart phone through an 'app' when they enter or exit the classroom. When students enter the class, the 'app' will disable their smart phone features and lock it out while only allowing the students to make/receive emergency calls. With student smart phone is in the locked condition, the teacher will have a software/application in the classroom computer connected to the base station database. This software/application will track students' attendance and will also be able to enable/disable students' phones. Upon exiting the class, the cube transmitter device on top of the door would scan the smart phones, and re-enable phone functionality, whereupon the smart phones would become fully functional just as they had been before the students and smart phones entered the class.

Students with smart phones would be required by the school to fill out a contract similar to the contracts they enter into at the beginning of each school year. Each student contract will state that if a student does have a smart phone or a phone with an application store, that student will be required to download an 'app' application for attendance and educational purposes. If a student does not have a smart phone or a phone with an application store, some sort of device will be provided that will be attached to their cell phone. The attached device will turn off the cell phone while it is resident in the classroom. The smart phone will only be returned to the on-condition when the student leaves the classroom. This arrangement would track attendance through the scanner in a manner similar to the app on the phone, but only for attendance purposes. Students with no cell phones would be required to wear a bracelet (like a Livestrong bracelet) that communicates with the cube transmitter that tracks attendance. This bracelet would also be available for use by students with phones that have been damaged or misplaced.

In the technology era students are more than ever inclined to use technological devices as distractions or as a way to cheat. With this product/service, the risk of cheating is greatly reduced and technological distractions are eliminated. Students will not be able to access: various social media, gaming, the Internet or SMS messaging. Through experience and observation, it is evident that students commonly use their phones to cheat on tests and quizzes. Students oftentimes take out their smart phone when a teacher is not looking and search up terms or questions that are present on an exam. The product/service of the present invention would make it virtually impossible to cheat because the phone would be locked out. Therefore, students would be denied access to the web. They would be prevented from texting their peers, and improper phone practice would be substantially eliminated.

FIG. 1 illustrates generally at 100 the steps involved in the operation of the Learning Guard System. At step 101 the student downloads the required 'app' from the Learning Guard Internet website. Installation of the 'app' requires the student to sign on with his or her name, and provide a list of emergency contacts so that phone calls from and to those contacts will not be disabled by the Learning Guard System. This student specific data is stored in the internal memory of the smart phone and will be used by the smart phone to decide whether an incoming call must be allowed or blocked. A copy of the student data is transmitted to the Learning Guard web based database in the cloud. This cloud database associates the smart phone ID with the student name and emergency contact list, and makes the database available to all cube transmitters. At step 102, the student enters a doorway to a classroom provided with a cube transmitter, which interrogates the smart phone for its ID. Once the ID is received, the cube transmitter sends the student ID data to a base station, which has connectivity to the Learning Guard database in the cloud. The cloud database provides complete information regarding the student, including the student's name and the emergency contact list linked to the smart phone ID. The base station creates a new database which indicates that the student is entering the classroom and creates a list of students present in the classroom as more students enter the classroom doorway. The communication from the base station to the cube transmitter commands the smart phone functionality to be turned off. Step 103 illustrates what happens when the student exits the classroom through the doorway. The cube transmitter communicates with the smart phone 'app', and recognizes that the smart phone functionality was previously turned off. Accordingly, the cube transmitter turns on the smart phone functionality. This action of the cube transmitter is communicated to the base station to update the database of students remaining in the classroom.

Figure 2:
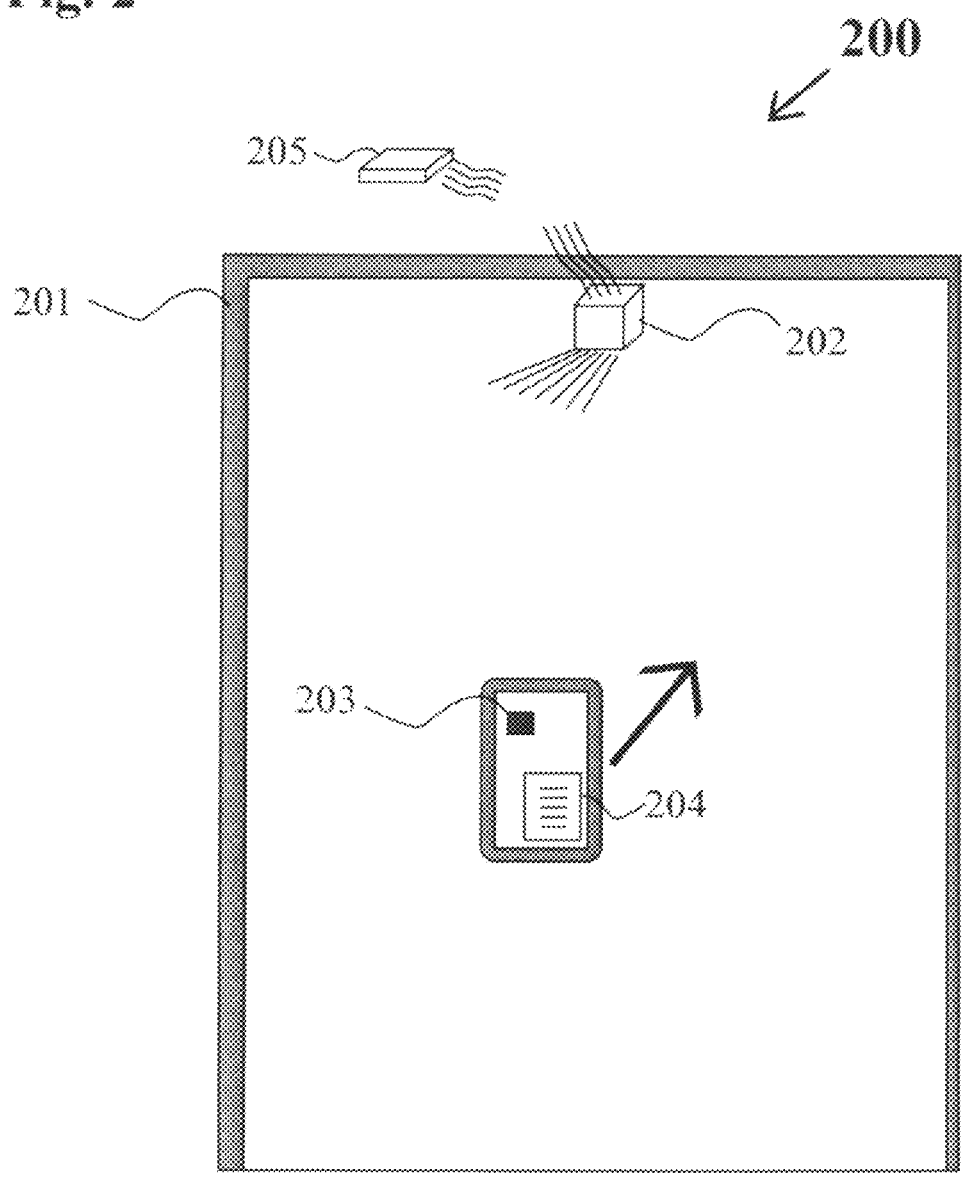
FIG. 2 is a schematic illustration of the classroom doorway Learning Guard arrangement.

FIG. 2 illustrates at 200 the classroom doorway arrangement. The doorway 201 has present a cube transmitter 202, which interacts with a previously downloaded 'app' 203 when a student with a smart phone enters the doorway, as shown by the arrow. The process of downloading and installing the 'app' requires the student to provide a student name and an emergency contact list, as well as a list of people from whom phone calls to the smart phone should not be blocked. This list resides in the memory of the smart phone shown at 204. A copy of the emergency contact list is stored by the Learning guard database in the cloud (not shown) and is available for all cube transmitters as well as the base station 205 that communicates with all cube transmitters close to the classroom. The cube transmitter acquires the smart phone ID and communicates the student ID data to the base station. The base station creates a database of all the students that entered the doorway to the classroom, and this list is made available to the classroom computer for use by the teacher, as detailed in the next figure.

Figure 3:
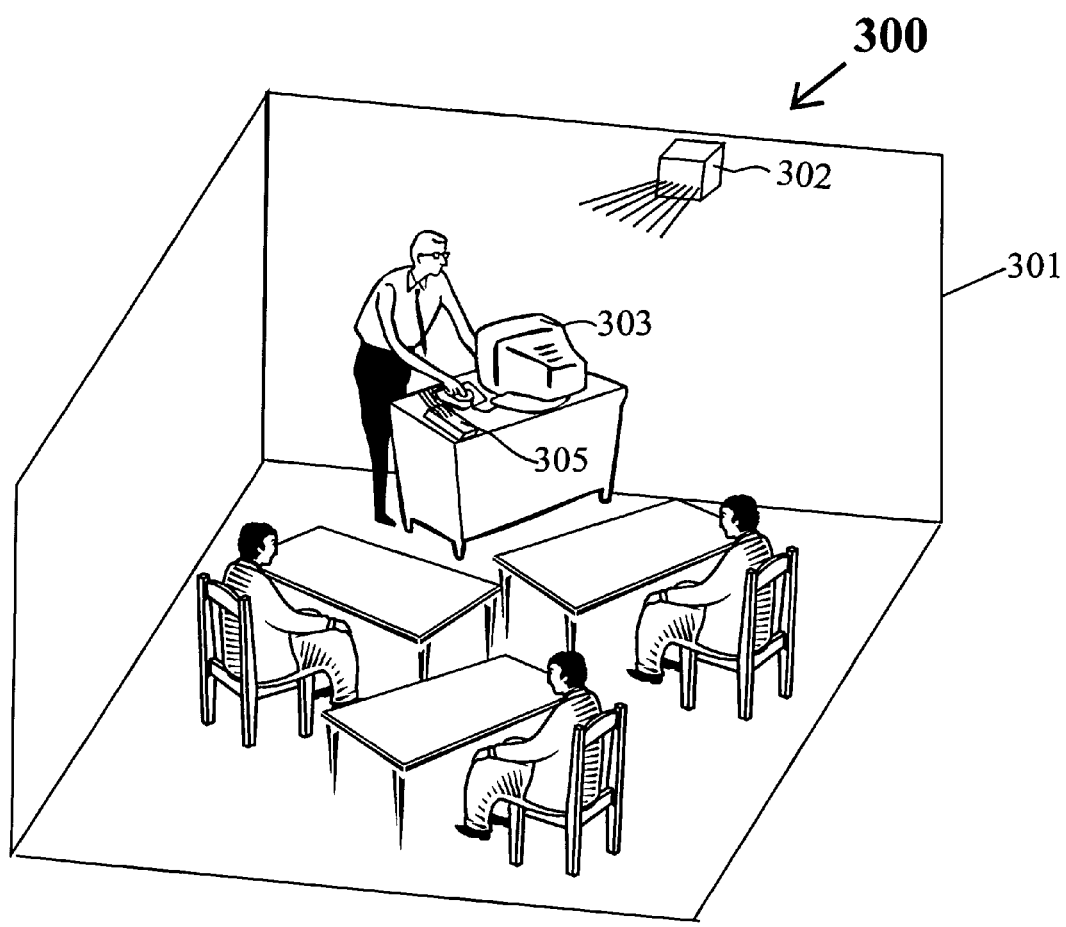
FIG. 3 is a schematic illustration of the classroom Learning Guard arrangement.

FIG. 3 illustrates at 300 an operative arrangement of the Learning Guard System in a classroom where several students are present and a teacher is providing study material. The classroom is indicated at 301 and a cube transmitter 302 is mounted on the wall of the classroom communicating with the base station 305. The teacher has a computer 303 in the classroom and is provided with a list of students present in the classroom by the transmission of a student in the classroom database from the base station. The teacher observes the student behavior and remarks are entered and added to the list of students in the classroom database that is maintained at the base station. The classroom database at the base station may be analyzed at a later time. The teacher may turn on or off any of the smart phones since a second cube transmitter 302 is present within the classroom.

At the end of the classroom session, the student leaves the classroom through the doorway in step 103 of FIG. 1 and the cube transmitter interacts with the 'app' in the smart phone and turns on all previously deactivated smart phone functionality. Accordingly, the classroom student database is updated to signify that a student having a designated smart phone Id and name has left the classroom.

The cube transmitter may have any shape and may be contained in a decorative object mounted on the doorway to the classroom or present in the classroom.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A Learning Guard System for protecting students in a classroom against distractions caused by a smart phone, comprising:

a) A smart phone having downloaded and installed thereon an 'app' from a system provider's market place;

b) installation of said 'app' requiring the student to sign in with a name and provide a list of emergency contacts, with respect to which phone calls should not be blocked;

c) said list being stored in the memory of the smart phone and being also uploaded to the Learning Guard web based database in a cloud;

d) the smart phone 'app' of the student communicating with a short range communication cube transmitter having battery back up mounted on a doorway to a classroom to acquire smart phone ID of a student entering the classroom doorway, and said 'app' turning off all functionality of the smart phone including voice, text communication, Internet access and playing of music or video files allowing only emergency contacts present in the emergency contact list in the memory of the smart phone to reach said smart phone during residence thereof within the classroom;

e) said cube transmitter communicating the smart phone ID to a base station that is linked to an Internet cloud Learning Guard database application, updating a database of students in the classroom, recording the entry of the student into the doorway of the classroom with the smart phone functionality turned off, and the database of students in the classroom being made available to a teachers computer for use in the classroom;

f) said teacher optionally using the classroom computer and the cube transmitter present within the classroom to restore functionality of the smart phone of a particular student and permit execution of a web search and other smart phone features; and g) said 'app' receiving communication from the short range cube transmitter to thereby turn on full functionality of the smart phone when the student leaves the classroom, whereby the student is isolated from smart phone distractions during residence in a classroom, thereby increasing the student's ability to concentrate what is being taught in the classroom.

2. The learning Guard System for protecting students in a classroom against distractions caused by a smart phone as recited by claim 1, wherein the said base station communicates with all cube transmitters and Learning Guard System databases in the cloud.

3. The Learning Guard System for protecting students in a classroom against distractions caused by a smart phone as recited by claim 2, wherein said teacher's computer communicates with said base station.

4. The Learning Guard System for protecting students in a classroom against distractions caused by a smart phone as recited by claim 1, wherein said emergency contact list may be updated anytime by the student logging on to the Learning Guard Internet web site, whereupon the emergency contact list in the smart phone memory as well as its copy in the Learning Guard cloud database is updated and made available to the base station.

5. The Learning Guard System for protecting students in a classroom against distractions caused by a smart phone as recited by claim 1, wherein said cube transmitter in the classroom in cooperation with the base station knows the students present in the classroom that have the smart phone functionality turned off, so that when the cube transmitter in the classroom finds one of the student's smart phone reinitialized by removing the battery, the cube transmitter turns off all the functionality of the smart phone in accordance with what is required in the classroom.

6. The Learning Guard System for protecting students in a classroom against distractions caused by a smart phone as recited by claim 1, wherein said 'app' is tailored for a Iphone platform or an Android platform smart phone device.

7. The Learning Guard System for protecting students in a classroom against distractions caused by a smart phone as recited by claim 1, wherein said cube transmitter may have any shape.

8. The Learning Guard System for protecting students in a classroom against distractions caused by a smart phone as recited by claim 1, wherein said cube transmitter communicates with smart phone using Bluetooth communication protocol.

9. The Learning Guard System for protecting students in a classroom against distractions caused by a smart phone as recited by claim 1, wherein said cube transmitter communicates with smart phone using infrared communication protocol.

10. The Learning Guard System for protecting students in a classroom against distractions caused by a smart phone as recited by claim 1, wherein said cube transmitter communicates with base station using wired communication.

11. The Learning Guard System for protecting students in a classroom against distractions caused by a smart phone as recited by claim 1, wherein said system service provider's market place is selected from the group consisting of the Google Play Store, the Apple App Store or Blackberry's Blackberry World.

* * * * *